United States Patent [19]

Matsuda

[11] Patent Number: 4,657,500
[45] Date of Patent: Apr. 14, 1987

[54] APPARATUS FOR FORMING A ROW OF ZIGZAG COUPLING ELEMENTS FOR SLIDE FASTENERS

[75] Inventor: Yasuhiko Matsuda, Toyama, Japan

[73] Assignee: Yoshida Kogyo K. K., Tokyo, Japan

[21] Appl. No.: 849,904

[22] Filed: Apr. 9, 1986

[30] Foreign Application Priority Data

Apr. 15, 1985 [JP] Japan .................................. 60-79704

[51] Int. Cl.⁴ .............................................. B29D 5/04
[52] U.S. Cl. ..................... 425/334; 29/34 A; 29/766; 264/285; 264/295; 425/391; 425/545; 425/814
[58] Field of Search ............... 425/112, 196, 224, 334, 425/319–322, 391, 545, 814; 29/33.2, 34 A, 766, 769; 264/285, 295

[56] References Cited

U.S. PATENT DOCUMENTS

| 3,054,149 | 9/1962 | Streicher | 264/285 |
| 3,255,288 | 6/1966 | Steingruebner | 425/391 X |
| 3,353,217 | 11/1967 | Bashover | 425/391 |
| 3,461,486 | 8/1969 | Porepp | 425/391 |
| 3,550,194 | 12/1970 | Frohlich | 425/391 |
| 3,680,604 | 8/1972 | Frohlich et al. | 425/391 X |
| 3,770,361 | 11/1973 | Heimberger | 425/814 X |
| 3,787,952 | 1/1974 | Moertel et al. | 29/33.2 X |
| 3,897,192 | 7/1975 | Heimberger et al. | 264/285 X |
| 4,325,184 | 4/1982 | Omori | 29/766 |

FOREIGN PATENT DOCUMENTS 669722 9/1963 Canada ............................ 29/12
59-125506 7/1984 Japan .

Primary Examiner—Richard L. Chiesa

[57] ABSTRACT

In an apparatus for forming a row of zigzag coupling elements, a winding unit includes a guide plate having a guide hole through which a monofilament is supplied onto a periphery of a continuously rotating die wheel. The guide plate is driven by two separate drive mechanisms, for lateral reciprocating movement and tangential reciprocating movement, respectively, with respect to the die wheel periphery so that the guide hole traces a horizontal figure-eight curve to thereby wind the monofilament alternately around a pair of rows of circumferentially staggered pins, on the die wheel periphery.

7 Claims, 21 Drawing Figures

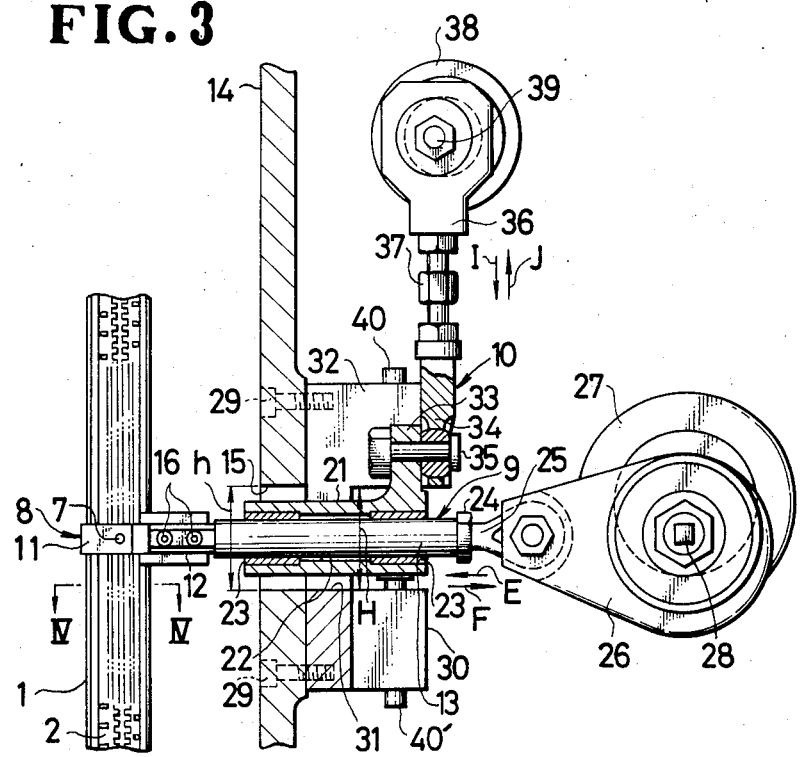
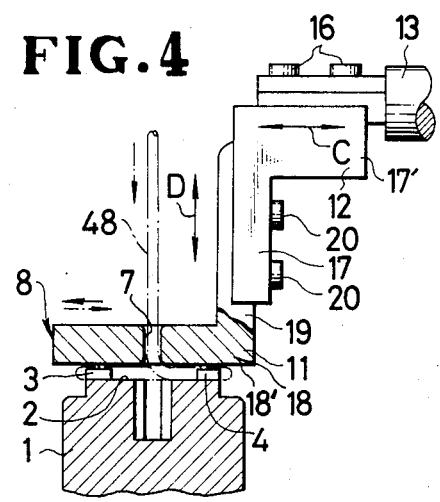
FIG. 3
FIG. 4

APPARATUS FOR FORMING A ROW OF ZIGZAG COUPLING ELEMENTS FOR SLIDE FASTENERS

BACKGROUND OF THE INVENTION

1. Field of the Invention

The present invention relates generally to the production of slide fasteners, and more particularly to an apparatus for forming a row of continuous zigzag coupling elements for slide fasteners from a monofilament of thermoplastic synthetic resin.

2. Description of the Prior Art

Canadian Pat. No. 669,722 and Japanese Patent Laid-Open Publication No. 59-125506 disclose a coupling-element forming apparatus which comprises a heated die wheel having an annular central groove in its peripheral surface and a pair of rows of circumferentially staggered pins disposed one row on each side of the groove. This prior apparatus also comprises a series of working units, i.e. a winding unit for winding a monofilament of thermoplastic synthetic resin around the pins in a zigzag form across the groove, a bending unit for forcing the zigzag monofilament into the groove to form a row of zigzag coupling element blanks having parallel legs interconnected at their lower ends by lower connecting portions, a punching unit for compressing the lower connecting portions against the bottom of the groove to form coupling heads each having a pair of lateral projections, a hammering unit (as occasion demands) for bending upper end portions of the parallel legs laterally outwardly away from each other to form raised connecting portions interconnecting adjacent coupling element blanks, and a discharging unit for removing the thus finalized coupling elements from the die wheel, these working units being arranged around the peripheral surface of the die wheel in this order.

The winding unit of the known apparatus includes a reciprocating guide plate having a guide hole through which the monofilament is guided so as to be shaped into a zigzag form on the peripheral surface of the die wheel. However, since the guide plate and hence the guide hole are reciprocable only in the directions of a generator of the peripheral surface of the die wheel, it is necessary to rotate the die wheel intermittently in timed relation to the reciprocating movements of the guide plate, thus causing only a limited rate of production.

SUMMARY OF THE INVENTION

It is therefore an object of the present invention to provide an apparatus for forming a row of continuous zigzag coupling elements from a monofilament of thermoplastic synthetic resin, in which apparatus the monofilament can be continuously wound in a proper zigzag form around pairs of circumferentially staggered pins on a peripheral surface of a die wheel while the latter is continuously rotated, thus providing an improved rate of production.

According to the present invention, an apparatus, for forming a row of zigzag coupling elements, has a winding unit including a guide plate having a guide hole through which a monofilament is supplied onto a periphery of a continuously rotating die wheel. The guide plate is driven by a pair of separate drive mechanisms for lateral reciprocating movement and tangential reciprocating movement, respectively, of the die wheel periphery so that the guide hole traces an inverted figure-eight curve to thereby wind the monofilament alternately around a pair of rows of circumferentially staggered pins on the die wheel periphery.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a cross-sectional view taken along line III—III of FIG. 2;

FIG. 4 is an enlarged cross-sectional view taken along line IV—IV of FIG. 3;

DETAILED DESCRIPTION

Figure 1:
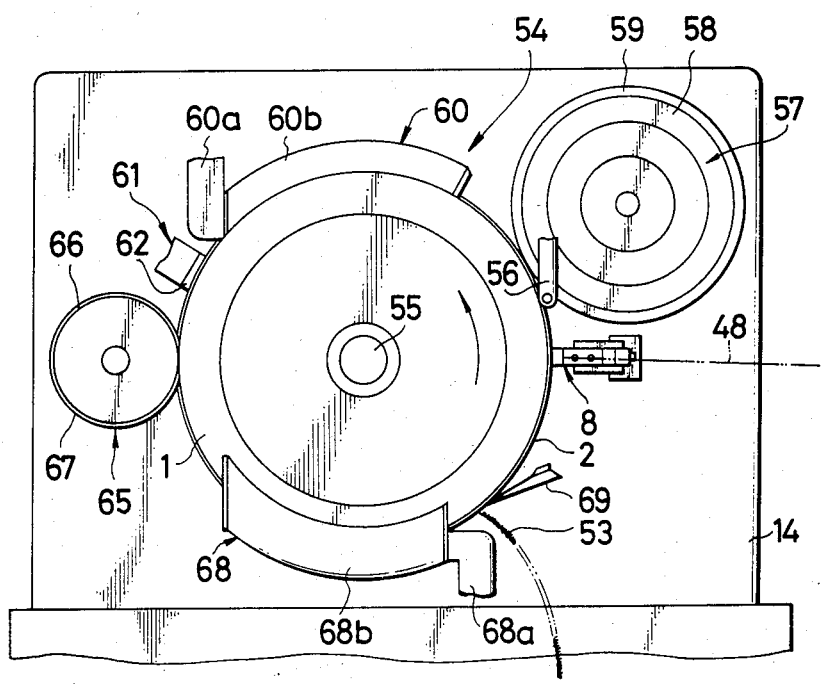
FIG. 1 is a side elevational view of an apparatus for forming a row of zigzag coupling elements according to the present invention.

As shown in FIG. 1, an apparatus 54 for forming a row of continuous zigzag coupling elements 53 for slide fasteners includes a die wheel 1 mounted on a frame 14 for counterclockwise rotation by a suitable drive (not shown). The die wheel 1 has an annular central groove 43 (FIG. 5A) in its peripheral surface 2, and a pair of first and second rows 5, 6 (FIG. 2) of circumferentially staggered pins 3, 4 disposed one row on each side of the groove 43, as shown in FIGS. 5A, 5B, 6A, 6B, 7A, 7B, 8A and 8B, there being a pair of rows of circumferentially staggered projections 46, 47 (FIG. 5B) on opposite side walls 44, 45 of the groove 43.

Figure 6A:
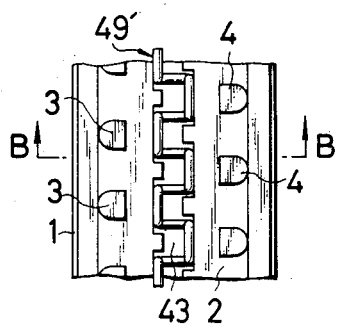
Figure 6B:
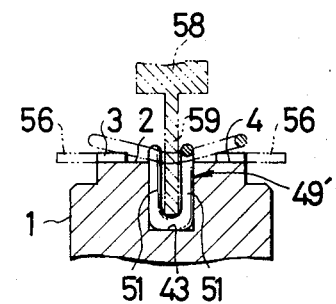

The apparatus 54 also includes a winding unit 8 for winding a monofilament 48 of thermoplastic synthetic resin, such as polyester and polyamide, alternately around the pins 3, 4 across the groove 43 in a zigzag form (FIGS. 5A and 10-14), a lifting unit 56 for lifting the zigzag monofilament 49 away from the pins 3, 4 (FIG. 6B), and a bending unit 57 having a peripheral bender head 59 on a rotary disk 58 for forcing the lifted zigzag monofilament 49 into the groove 43 to form a row of zigzag coupling element blanks 49' having parallel legs 51, 51 interconnected at their lower ends by lower connecting portions (FIGS. 6A and 6B).

The apparatus 54 also includes a punching unit 61 for compressing or deforming each lower connecting portion to form a coupling head 50 having a pair of lateral projections (FIGS. 7A and 7B), a hammering unit 65 having a peripheral hammer head 67 on a rotary disk 66 for bending upper end portions of the parallel legs 51, 51 laterally outwardly away from each other to form raised connecting portions 52, 52 interconnecting adjacent coupling element blanks 49' (FIGS. 8A and 8B), and a discharging unit 69 for removing the thus finalized coupling elements, 53 from the die wheel 1. The discharging unit 69 is in the form of a scraper having a distal end touching the bottom of the groove 43. The peripheral surface 2 of the die wheel 1 is additionally (as described below) heated locally by an exterior heater 60 disposed on the upper side of the die wheel 1 for heat setting the monofilament 48 in the form of U-shaped coupling element blanks 49', and is cooled locally by a cooling unit 68 disposed on the lower side of the die wheel 1.

These working units, namely, the winding unit 8, the lifting unit 56, the bending unit 57, the exterior heater 60, the punching unit 61, the hammering unit 65, the cooling unit 68 and the discharging unit 69, are arranged around the peripheral surface 2 of the die wheel 1 in this order in the direction of rotation of the die wheel 1.

The die wheel 1 is mounted on a shaft 55 supported on the frame 14 for counterclockwise rotation, and has a cavity (not shown) within which an interior heater (not shown) is disposed for heating the whole of the die wheel 1 so as to maintain its temperature slightly lower than the temperature at which the monofilament 48 is deformable.

The exterior heater 60 includes a blast pipe 60a for heated air, and a cover 60b of generally C-shaped cross section connected to the blast pipe 60a and enclosing an upper portion of the peripheral surface 2 of the die wheel 1. The cover 60b is closed at one end (left in FIG. 1) adjacent to the punching unit 61 and is open at the other end (right in FIG. 1) adjacent to the bending unit 57 so that the heated air introduced from the blast pipe 60a flows from the punch-unit end to the bending-unit end in a direction opposite to the direction of rotation of the die wheel 1. The exterior heater 60 serves to additionally heat the peripheral surface 2 of the die wheel 1 locally such that the temperature of the monofilament in the form of U-shaped coupling element blanks 49' (FIGS. 6A and 6B) rises to its characteristic heat setting temperature immediately before the coupling heads 50 are formed.

Likewise, the cooling unit 68 includes a blast pipe 68a for outside air, and a cover 68b of generally C-shaped cross section connected to the blast pipe 68a and enclosing a lower portion of the peripheral surface 2 of the die wheel 1. The cover 68b is closed at one end (right in FIG. 1) adjacent to the discharging unit 69 and is open at the other end (left in FIG. 1) adjacent to the hammering unit 65 so that the outside air introduced from the blast pipe 68a flows from the discharging-unit end to the hammering-unit end in a direction opposite to the direction of rotation of the die wheel 1. The cooling unit 68 serves to cool the peripheral surface 2 of the die wheel 1 locally such that the monofilament 48 in the final shape of zigzag coupling elements 53 (FIGS. 8A, 8B, 16 and 17) is cooled immediately before it is removed and discharged from the die wheel 1.

The pins 3, 4 of each row 5, 6 are spaced at a uniform distance or pitch P (FIG. 2) along the peripheral surface 2 of the die wheel 1 and are disposed laterally out of position with respect to those of each other's row by half the pitch P.

Figure 2:
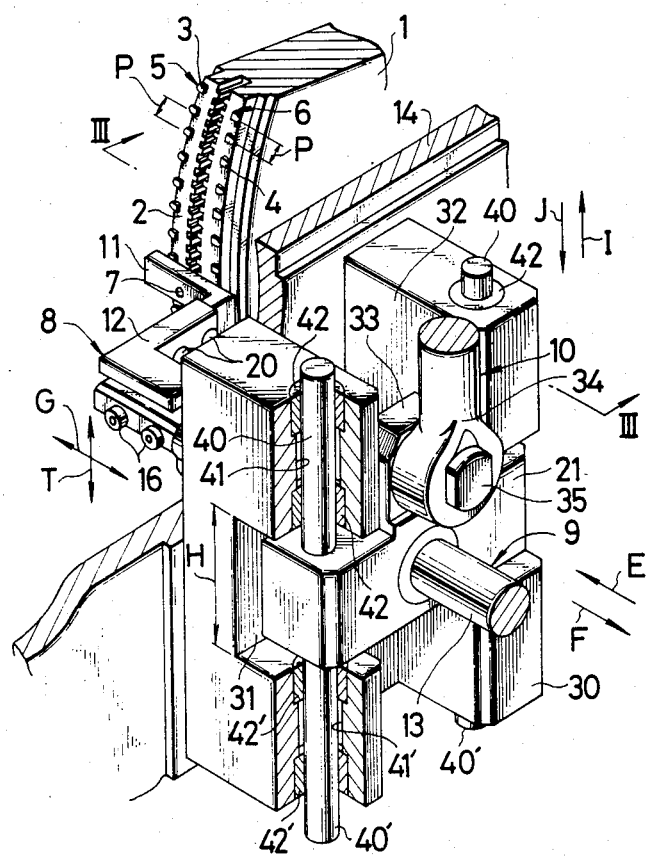
FIG. 2 is an enlarged perspective view, with parts broken away, of FIG. 1, showing a winding unit.
Figure 5A:
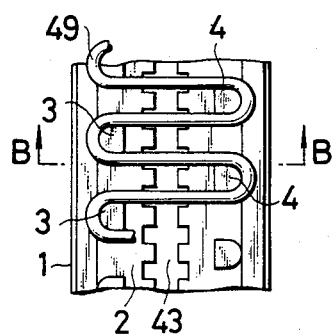
FIGS. 5A, 6A, 7A and 8A are fragmentary enlarged plan views of a peripheral surface of a die wheel, illustrating the manner in which a monofilament is progressively shaped into a row of zigzag coupling elements.
Figure 5B:
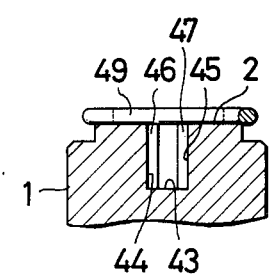
FIGS. 5B, 6B, 7B and 8B are cross-sectional views taken along line B-B of FIGS. 5A, 6A, 7A and 8A, respectively.

As shown in FIGS. 2 through 4, the winding unit 8 generally comprises a monofilament guiding member 11 having a guide hole 7 through which the monofilament 48 is supplied onto the die wheel 1, a first drive mechanism 9 operatively connected to the guiding member 11 for imparting to the guide hole 7 reciprocating movements in the directions G of a generator of the peripheral surface 2 of the die wheel 1 (hereinafter referred to simply as "lateral reciprocating movements"), and a second drive mechanism 10 also operatively connected to the guiding member 11 but for imparting to the guide hole 7 reciprocating movement in the directions T of a tangent to the peripheral surface 2 of the die wheel 1 (hereinafter referred to simply as "tangential reciprocating movement".

The guiding member 11 is an L-shaped guide plate having a pair of first and second arms 18, 19 lying at a right angle to each other, and an L-shaped connecting plate 12 having a pair of third and fourth arms 17 and 17' lying at a right angle to each other. The first arm 18 of the guide plate 11 faces the peripheral surface 2 of the die wheel 1 in closely spaced relationship, while the second arm 19 is secured to the third arm 17 of the connecting plate 12 by a pair of screws 20, 20 so as to be adjustable in the directions of a double-headed arrow D (FIG. 4). Thus the gap between the bottom surface 18' of first arm 18 of the guide plate 11 and the pins 3, 4 on the peripheral surface 2 of the die wheel 1 can be varied and hence adjusted by shifting the second arm 19 on the third arm 17 of the connecting plate 12. Preferably, this gap is smaller than the diameter of the monofilament 48.

The fourth arm 17' of the connecting plate 12 is secured to a front end (left in FIG. 3) of a reciprocating rod 13 of the first drive mechanism 9 by a pair of screws 16, 16 so as to be adjustable axially of the rod 13, namely, in the directions of a double-headed arrow C (FIG. 4). Thus the guide plate 11 can be adjusted in the directions G of a generator of the peripheral surface 2 of the die wheel 1 by shifting the fourth arm 17' axially on the rod 13.

As best shown in FIG. 3, the rod 13 of the first drive mechanism 9 extends through a hole 22 of a guide block 21 and is journalled by a pair of bearings 23, 23 in the hole 22 so as to be slidable axially thereof, i.e. in the directions of arrows E, F. The guide block 21 extends through an opening 15 in the frame 14. A rear end 24 (right in FIG. 3) of the rod 13 is connected to one end of a first link 26 through the medium of a first swivel bearing 25. The other end of the first link 26 is rotatably connected to a first eccentric pin 28 of a first input shaft 27 which is driven by a first drive (not shown) for continuous rotation. Thus the rod 13 reciprocates in the directions of the arrows E, F in response to the rotation of the first input shaft 27.

The reciprocating rod 13, the guide block 21, the first swivel bearing 25, the first link 26, the first eccentric pin 28, the first input shaft 27 and the non-illustrated first drive jointly constitute the first drive mechanism 9 for imparting to the guide hole 7 of the guide plate 11 the above-mentioned lateral reciprocating movement.

The guide block 21 is received in a cross-shaped groove or cavity of a guide-block holder 30 mounted on the rear side (right in FIG. 3) of the frame 14 by a plurality of screws 29, the cross-shaped cavity being composed of a horizontal portion 31 and a vertical portion 32 extending centrally across the horizontal portion 31.

The guide block 21 has an upwardly directed projection 33 which extends into the vertical groove portion 32 and to which a second swivel bearing 34 is pivotally connected by a pin 35. The second swivel bearing 34 is also connected to one end of a second link 36 by an adjusting nut 37. The other end of the second link 36 is rotatably connected to a second eccentric pin 39 of a second input shaft 38 which is driven by a second drive (not shown) for continuous rotation at a rate of rotation two times higher than that of the first input shaft 27. Thus the guide block 21 and hence the rod 13 reciprocates vertically, i.e. in the directions of arrows I, J in response to the rotation of the second input shaft 38.

Both the width or height H of the horizontal groove 31 and the height h of the opening 15 of the frame 14 are determined so as to allow the vertical reciprocating movement (in the directions of the arrows I, J) of the guide block 21 without any obstruction.

For stabilizing its vertical reciprocating movement, the guide block 21 has a pair of upwardly directed guide posts 40, 40 each axially slidably received in an upper vertical hole 41 of the guide-block holder 30 via a pair of upper bearings 42, 42, and a pair of downwardly directed guide posts 40', 40' each axially slidably received in a lower vertical hole 41' of the guide-block holder 30 via a pair of lower bearings 42', 42'.

The upwardly directed projection 33 of the guide block 21, the second swivel bearing 34, the second link 36, the second eccentric pin 39, the second input shaft 38, and the non-illustrated second drive jointly constitute the second drive mechanism 10 for imparting to the guide hole 7 of the guide plate 11 the above-mentioned tangential reciprocating movement.

Figure 9:
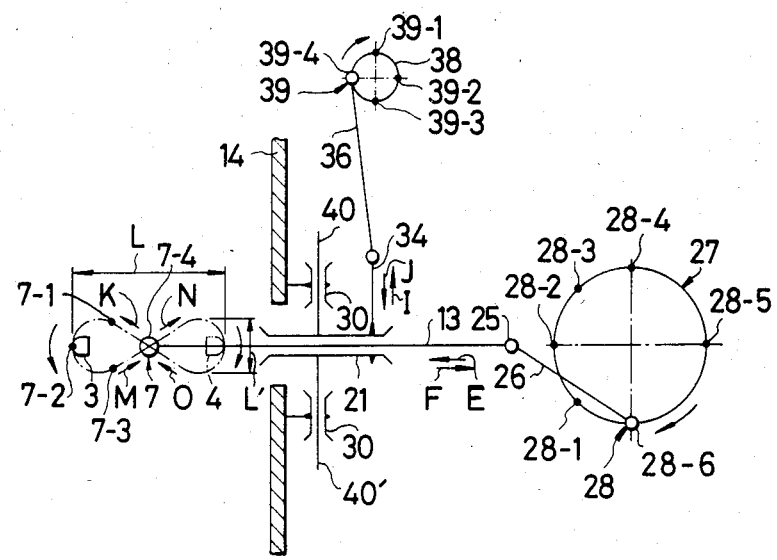
FIG. 9 is a diagrammatic view of the winding unit, illustrating the locus of movement of each of various parts.

FIG. 9 is a diagrammatic view of the winding unit 8 of FIG. 2, illustrating the locus of movement of each of various parts. As the first input shaft 27 is rotated by the non-illustrated first drive, the rod 13 reciprocates in the directions of the arrows E, F, thus causing the guide hole 7 (of the guide plate 11) to reciprocate through a predetermined horizontal distance L. This horizontal distance L is such that the guide hole 7 can move between the outer surface of each pin 3 of the first row 5 and the outer surface of each pin 4 of the second row 6 (on the die wheel 1).

Simultaneously, the guide block 21 reciprocates in the directions of the arrows I, J owing to the rotation of the second input shaft 38 by the non-illustrated second drive. This reciprocating movement of the guide block 21 causes the rod 13 and hence the guide hole 7 (of the guide plate 11) to reciprocate through a predetermined tangential distance L'. This tangential distance L' is such that the guide hole 7 can move around the opposite side surfaces of the preceding pin 3 (of the first row 5) and then the opposite side surfaces of the succeeding pin 4 (of the second row 6). Although in FIG. 9 the pin 4 of the second row 6 is illustrated as it is in lateral alignment with the pin 3 of the first row 5, the fact is that the succeeding pin 4 travels to this phantom line position from a position half the pitch P behind the preceding pin 3 in the solid-line position while the guide hole 7 makes a single travel about the preceding pin 3.

The speed of rotation of the die wheel 1, the stroke and the speed of movement of the individual part of the first drive mechanism 9, and the stroke and the speed of movement of the individual part of the second drive mechanism 10 are coordinated in such a relation that the guide hole 7 of the guide plate 11 traces a horizontal figure-eight shaped curve, known as a lemniscate of Bernouli, as the guide hole 7 makes a complete round trip about a pair of the successive pins 3 and 4.

In FIG. 9, which shows the guide hole 7 as it is disposed centrally between the first row 5 of the pins 3 and the second row 6 of the pins 4, when the first and second input shafts 27, 28 rotate clockwise on their respective axes, the first eccentric pin 28 moves in a circular path firstly from the position 28-6 to the position 28-2 via the position 28-1, and at the same time, the second eccentric pin 39 moves in a circular path from the position 39-4 to the position 39-2 via the position 39-1, thus causing the guide hole 7 to travel in the direction of an arrow K from the position 7-4 to the position 7-2 via the position 7-1. Then as the first eccentric pin 28 further moves to the position 28-4 via the position 28-3 and also as the second eccentric pin 39 further moves to the original position 39-4 via the position 39-3, the guide hole 7 travels in the direction of an arrow M to the original position 7-4 via the position 7-3. Thus the guide hole 7 has made a complete round trip about the preceding pin 3.

Similarly, as the first eccentric pin 28 further moves to return to the original position 28-6 via the position 28-5 and also as the second eccentric pin 39 moves around again to return to the original position 39-4 via the positions 39-1, 39-2, 39-3, the guide hole 7 travels in the direction of an arrow N and then in the direction of an arrow O to the original position 7-4. Thus the guide hole 7 has made a complete round trip about the succeeding pin 4. As a result, the guide hole 7 has traced a lemniscate, which is a curve shaped like the figure (horizontal) eight.

Figure 10:
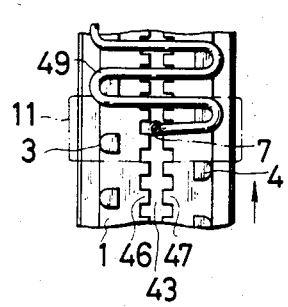
FIGS. 10 through 14 are fragmentary enlarged plan views of the peripheral surface of the die wheel, illustrating the manner in which the monofilament is progressively wound around a pair of rows of pins on the peripheral surface of the die wheel by the winding unit.
Figure 11:
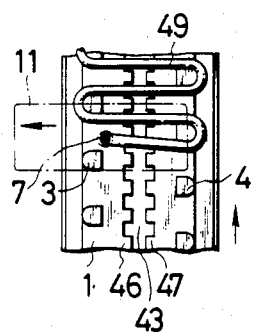
Figure 12:
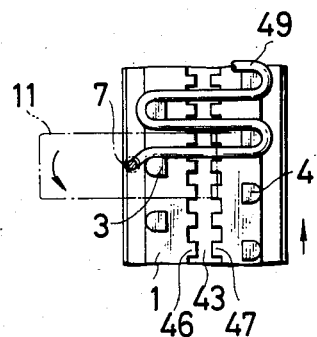
Figure 13:
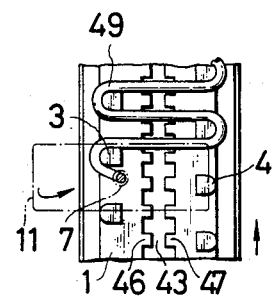
Figure 14:
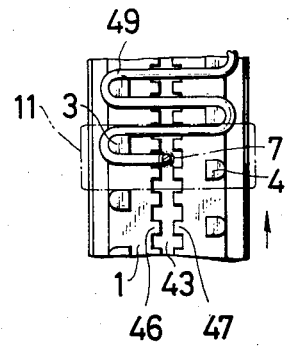

FIGS. 10 through 14 illustrate the manner in which the linear monofilament 48 is progressively wound around the staggered pins 3, 4 in a zigzag form as it is guided by the guide hole 7 of the guide plate 11. Only half the figure-eight movement of the guide hole 7 is illustrated here for clarity. FIG. 10 shows the guide hole 7 as it is disposed centrally between the pins 3, 4 on the peripheral surface 2 of the die wheel 1, namely, in the position 7-4 of FIG. 9. FIGS. 11, 12 and 13 show the guide hole 7 as it is disposed in the position 7-1, the position 7-2 and the position 7-3, respectively, of FIG. 9. FIG. 14 show the guide hole 7 having returned to the original position 7-4 of FIG. 9. Thus the monofilament 48 has been wound around the preceding pin 3 (of the first row 5). Subsequently, the winding of the monofilament 48 around the succeeding pin 4 (of the second row) takes place in the same but reverse manner as the winding in connection with the preceding pin 3.

In FIGS. 10 through 14, the position of the pins 3, 4 varies little by little from one view to another because of the continuous rotation of the die wheel 1.

In the embodiment described above, because the guide posts 40, 40' of the guide block 21 are slidably received in the holes 41, 41' of the guide-block holder 30 fixedly mounted on the frame 14, the guide block 21 is reciprocable only in the directions of the arrows I, J (FIGS. 2, 3 and 9). Meanwhile the rod 13, which is slidably received in the horizontal hole 22 of the guide block 21, is reciprocable axially of the hole 22 only in the directions of the arrows E, F. (FIGS. 2, 3 and 9). Consequently, the guide hole 7 of the guiding member 11, which is secured to the rod 13, can move so as to trace a lemniscate or a horizontal figure-eight shaped curve (which is symmetric) without any shake, thus enabling accurate winding of the monofilament 48 around the staggered pins 3, 40.

Further, with this arrangement, the distance between the bottom surface 18' (FIG. 4) of the first arm 18 of the guide plate 11 and the top surfaces of the pins 3, 4 can be kept constant during the winding.

Figure 15:
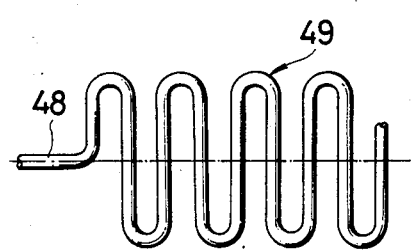
FIG. 15 is a fragmentary enlarged plan view showing the monofilament in a zigzag form.
Figure 16:
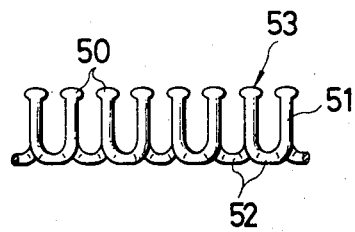
FIG. 16 is a fragmentary enlarged front elevational view of a row of folded zigzag coupling elements formed according to the present invention.
Figure 17:
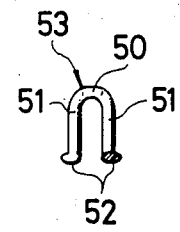
FIG. 17 is a rightside elevational view of FIG. 16.

FIG. 15 shows a zigzag shaped element blank 49 having been formed from the linear monofilament 48 by the action of the winding unit 8.

A row of continuous zigzag coupling elements 53 (FIGS. 16 and 17) is formed on the apparatus 54 (FIG. 1) in the following manner:

Firstly, a monofilament 48 of thermoplastic synthetic resin, e.g. polyethylene terephthalate, is wound alternately around the pins 3, 4 across the central groove 43 in the peripheral surface 2 of the die wheel 1 in a zigzag form (FIGS. 5A, 5B and 10-14). Then the zigzag monofilament 49 is lifted away from the pins 3, 4 by the lifting unit 56 and is subsequently forced in the central groove 43 so as to be shaped into a row of folded U-shaped coupling element blanks 49' having parallel legs 51, 51 interconnected at their lower ends by lower connecting portions (FIGS. 6A and 6B). During that time, the monofilament 49, 49' is heated by the non-illustrated interior heater at a constant temperature slightly lower than the characteristic temperature at which the particular monofilament 48 is deformable.

Figure 7A:
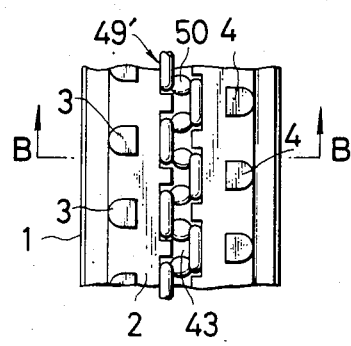
Figure 7B:
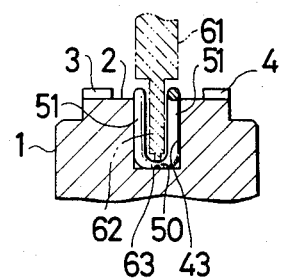

The monofilament 48, in the form of the thus U-shaped coupling element blanks 49' retained in the groove 43, is additionally heated locally by the exterior heater 60 such that its temperature rises to a heat setting temperature, whereupon the lower connecting portions of the U-shaped coupling element blanks 49' are compressed or deformed, by the reciprocable punch head 62 of the punching unit 61, into the shape of coupling heads 50 each having a pair of lateral projections (FIGS. 7A and 7B).

Figure 8A:
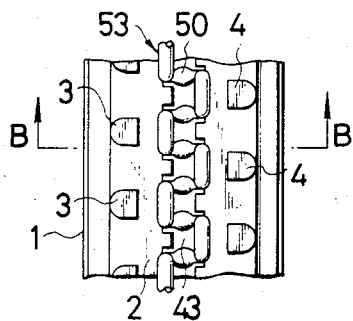
Figure 8B:
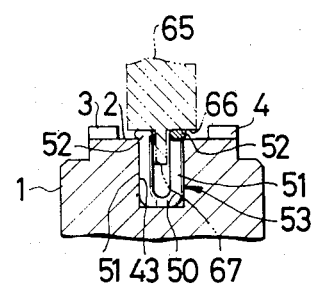

Subsequently, the opposed upper end portions of the parallel legs 51, 51 of the coupling element blanks 49' projecting from the central groove 43 are bent, by stepped portions of a rotary hammer head 67 of the hammering unit 65, laterally outwardly away from each other to form raised connecting portions 52, 52 (FIGS. 8A and 8B). Thus the row of zigzag coupling elements 53 of a final shape (FIGS. 16 and 17) has been provided.

Finally, this row of zigzag coupling elements 53 retained in the groove 43 is removed and discharged from the peripheral surface 2 of the die wheel 1 by the scraper of the discharging unit 69 after having been cooled by the cooling unit 68. Thus a single cycle of coupling-element formation has been completed.

Although each of the first and second drive mechanisms 9, 10 employs an eccentric mechanism in the illustrated embodiment, a cam mechanism may be substituted for the eccentric mechanism. Also, dovetail connections may be employed in place of the sleeve-and-rod connections that is used in the illustrated embodiment for guiding the reciprocating rod 13 and the guide block 21.

According to the present invention, the stroke and the speed of movement of the individual part of the first drive mechanism 9 and the stroke and the speed of the individual part of the second drive mechanism 10 are coordinated in such a relation that the guide hole 7 of the guide plate 11 traces a lemniscate, which is a horizontal symmetric figure-eight curve, as the guide hole 7 makes a complete round trip about a pair of the successive pins 3 and 4. With this arrangement, it is possible to continuously wind the monofilament alternately around the staggered pins in a zigzag form while the die wheel is continuously rotated, thus causing an improved rate of production.

Although various minor modifications may be suggested by those versed in the art, it should be understood that I wish to embody within the scope of the patent warranted hereon, all such embodiments as reasonably and properly come within the scope of my contribution ot the art.

What is claimed is:
1. An apparatus for forming a row of continuous zigzag coupling elements for slide fasteners from a monofilament of thermoplastic synthetic resin, said apparatus comprising:
 (a) a frame;
 (b) a die wheel mounted on said frame for continuous rotation and having an annular groove in its peripheral surface, and a pair of first and second rows of circumferentially staggered pins disposed one row on each side of said annular groove;
 (c) a winding unit disposed in confronting relation to said peripheral surface of said die wheel for winding the monofilament alternately around said staggered pins across said annular groove in a zigzag form;
 (d) a bending unit disposed in confronting relation to said peripheral surface of said die wheel and circumferentially spaced from said winding unit in the direction of rotation of said die wheel for forcing the zigzag monofilament into said annular groove so as to shape the same into a row of folded U-shaped zigzag coupling element blanks having parallel legs interconnected at their lower ends by lower connecting portions;
 (e) a punching unit disposed in confronting relation to said peripheral surface of said die wheel and circumferentially spaced from said bending unit in the direction of rotation of said die wheel for compressing the lower connecting portions of the U-shaped coupling element blanks into the shape of coupling heads to thereby put the coupling element blanks in a final form of the coupling elements; and
 (f) said winding unit including a guide plate having a guide hole through which the monofilament is supplied onto said die wheel, a first drive mechanism operatively connected to said guide plate for imparting to said guide plate reciprocating movement (hereinafter called lateral reciprocating movement) in the direction of a generator of said peripheral surface of said die wheel, a second drive mechanism operatively connected to said guide plate for imparting to said guide plate reciprocating movement (hereinafter called tangential reciprocating movement) in the direction of a tangent of said peripheral surface of said die wheel, said guide plate thereby being movable, as a result of a combination of said lateral reciprocating movement and said tangential reciprocating movement, in such a manner that said guide hole traces a lemniscate as the monofilament is wound around a preceding one of said pins of said first row and a succeeding one of said pins of said second row.

2. An apparatus according to claim 1, said first drive mechanism comprising a guide block having a horizontal hole and vertically movably supported on a holder fixedly mounted on said frame; a reciprocable rod axially slidably received in said horizontal hole of said guide block and operatively connected at one end to said guide plate, a first input shaft continuously rotatable about its axis, and first transmitting means for converting the rotational motion of said first input shaft into the axial reciprocating motion of said rod, said second drive mechanism comprising a second input shaft continuously rotatable about its axis, and second transmitting means for converting the rotational motion of said second input shaft into the vertical reciprocating motion of said guide block and hence of said rod.

3. An apparatus according to claim 2, said guide plate being of an L shape having a pair of first and second arms lying at a right angle to each other and being connected to said one end of said rod via an L-shaped connecting plate having a pair of third and fourth arms lying at a right angle to each other, said first arm of said guide plate facing said peripheral surface of said die wheel with a gap therebetween, said second arm being adjustably secured to said third arm of said connecting plate so that said gap can be varied and hence adjusted by shifting said second arm on said third arm, said fourth arm of said connecting plate being adjustably secured to said one end of said rod so that said guide plate can be adjusted in the directions of the generator of said peripheral surface of said die wheel by shifting said fourth arm on said rod axially.

4. An apparatus according to claim 2, said holder having a cross-shaped cavity receiving therein said guide block for vertical movement, said cross-shaped cavity being composed of a horizontal portion and a vertical portion extending centrally across said horizontal portion.

5. An apparatus according to claim 4, said guide block having a plurality of upwardly directed guide posts and a plurality of downwardly directed guide posts, said holder having a plurality of upper vertical holes and a plurality of lower vertical holes for axially slidably receiving said upwardly directed posts and said downwardly directed posts, respectively.

6. An apparatus according to claim 2, said first transmitting means including a first eccentric pin disposed on a distal end of said first input shaft, and a first link pivotally connected at one end to said first eccentric pin and at the other end to the other end of said rod, said second transmitting means including a second eccentric pin disposed on a distal end of said second input shaft, and a second link pivotally connected at one end to said second eccentric pin and at the other end to said guide block.

7. An apparatus according to claim 3, said second input shaft being rotatable at a rate of rotation two times higher than that of said first input shaft.

* * * * *